United States Patent [19]

Heck et al.

[11] Patent Number: 5,729,686
[45] Date of Patent: Mar. 17, 1998

[54] METHOD FOR INITIALIZING A NETWORK HAVING A PLURALITY OF NETWORK SUBSCRIBERS CAPABLE OF ACTING AS MASTERS

[75] Inventors: Patrick Heck, Durmersheim; Herbert Hetzel, Weingarten, both of Germany

[73] Assignee: Becker GmbH, Karlsbad, Germany

[21] Appl. No.: 597,508

[22] Filed: Feb. 2, 1996

[30]   Foreign Application Priority Data

Feb. 2, 1995 [DE] Germany .................. 195 03 209.8

[51] Int. Cl.[6] .................................................. G06F 12/00
[52] U.S. Cl. .................. 395/200.38; 395/504; 395/290; 395/200.5; 395/200.52; 364/132; 377/115
[58] Field of Search .............................. 395/290, 504, 395/200.05, 200.06, 200.01, 200.38, 200.5, 200.52; 364/132; 377/115; 379/171; 455/533.1; 367/514 C

[56]   References Cited

U.S. PATENT DOCUMENTS

| | | | |
|---|---|---|---|
| 4,430,651 | 2/1984 | Bryant et al. | 340/825.52 |
| 4,488,232 | 12/1984 | Swaney et al. | 364/200 |
| 4,630,264 | 12/1986 | Wah et al. | 370/85 |
| 4,969,146 | 11/1990 | Twitty et al. | 370/85.1 |
| 5,053,883 | 10/1991 | Johnson | 358/349 |
| 5,373,503 | 12/1994 | Chen | 370/18 |
| 5,436,905 | 7/1995 | Li et al. | 370/95.2 |
| 5,530,702 | 6/1996 | Palmer et al. | 370/85.3 |
| 5,544,196 | 8/1996 | Tiedemann, Jr. et al. | 375/200 |
| 5,600,651 | 2/1997 | Molle | 370/448 |

*Primary Examiner*—Emanuel T. Voeltz
*Assistant Examiner*—Patrick Assouad
*Attorney, Agent, or Firm*—Herbert L. Lerner; Laurence A. Greenberg

[57]   ABSTRACT

A method for initializing a network having a plurality of network subscribers being capable of acting as masters, includes assigning the master function to the network subscriber being capable of acting as a master that is turned on first. In the event of a collision when the master function is assigned substantially simultaneously to a plurality of substantially simultaneously turned-on network subscribers, a random value that differs in magnitude is generated in all of these network subscribers. Finally, the network subscriber that has generated the highest or the lowest value is assigned the master function.

11 Claims, 1 Drawing Sheet

METHOD FOR INITIALIZING A NETWORK HAVING A PLURALITY OF NETWORK SUBSCRIBERS CAPABLE OF ACTING AS MASTERS

BACKGROUND OF THE INVENTION

FIELD OF THE INVENTION

The invention relates to a method for initializing a network having a plurality of network subscribers being capable of acting as masters, in which the network subscriber being capable of acting as a master that is turned on first is assigned the master function, i.e. the function of acting as a master.

The present invention shows a network with ring-like architecture, in which subscribers forming data sources and data sinks are connected through a single data line. Through that data line, the source and control data are transferred in a continuous data stream which is synchronous to a clock signal. The clock signal is generated by a single subscriber, referred to below as a master. All other subscribers, referred to below as a slave, synchronize themselves to that clock signal. Purely asynchronous data transmision methods have to be differentiated therefrom as packet or package-oriented data transmission methods, for example ATM-methods.

In networks that are known from the prior art, a plurality of network subscribers which are all capable of performing the master function in the network are often used. As compared with the use of only a single network subscriber being capable of acting as a master, the advantage thereof is that for operation of the network, it is not an absolute prerequisite that a certain network subscriber, namely the only network subscriber capable of acting as a master, be on. If a plurality of network subscribers being capable of acting as masters are provided, then the network can be put into operation as soon as one of those network subscribers is turned on. From that standpoint, it is logical in certain applications to configure not merely some, but all, of the network subscribers of a network in such a way that they can take on the master function if needed. A problematic aspect of networks having a plurality of network subscribers being capable of acting as a master is the fact that in the event that two or more network subscribers being capable of acting as a master are turned on substantially simultaneously, all of those network subscribers will be assigned the master function. That causes a collision, which produces a malfunction in the network and makes it necessary to turn on the network, or the network subscribers involved, all over again.

SUMMARY OF THE INVENTION

It is accordingly an object of the invention to provide a method for initializing a network having a plurality of network subscribers capable of acting as masters, which overcomes the hereinafore-mentioned disadvantages of the heretofore-known methods of this general type and with which in the event of a collision, it is not necessary to turn the network subscribers on all over again.

With the foregoing and other objects in view there is provided, in accordance with the invention, a method for initializing a network having a plurality of network subscribers being capable of acting as masters, which includes assigning a function of acting as a master to the network subscriber being capable of acting as a master that is turned on first, which comprises, in the event of a collision when the master function is assigned substantially simultaneously to a plurality of substantially simultaneously turned-on network subscribers, generating a random value differing in magnitude in the plurality of network subscribers; comparing magnitudes of the generated random values in the affected network subscribers; and finally assigning the master function to the network subscriber having generated the best value, in the sense of being the highest or the lowest value.

If the collision situation occurs when the method of the invention is used and if it is ascertained that two or more network subscribers have been assigned the master function, then network operation is temporarily not yet started. Instead, the assignment of the master function that was made is cancelled, and in all of the network subscribers to which the master function had been assigned before that, a comparison process is tripped, in which the best random value among those generated by the affected network subscribers is ascertained. In particular, this is the highest or lowest of these values. The master function is then assigned to the network subscriber which has generated the best random value.

In accordance with another mode of the invention, the comparison process is performed in such a way that the affected network subscribers, that is the network subscribers which collide with one another when the master function is allocated, exchange the random values they have generated with one another, and each network subscriber drops out of the comparison process when it receives a better value than the random value it generated itself. In this way, the comparison process is completed as quickly as possible, and only the network subscriber having the best random value is left.

In accordance with a further mode of the invention, in a network having a unidirectional ring structure, the random values can, for instance, be passed over this network to the next network subscriber in succession. Each network subscriber compares the values received with the random value it has generated itself and stored in memory. If a received value is better than its own random value, then this network subscriber drops out of the comparison process. In other words, it does not carry out any further comparison with its memorized random value but instead merely passes on the values it has received to the network subscribers that follow it.

As soon as a network subscriber receives the random value back again that it had generated itself, this network subscriber is assigned the master function. That is, if a network subscriber receives the random value that it had itself generated, which it learns from comparison with the random value stored in memory, then it is clear that the random value it has generated is the best one among all of the network subscribers. If that were not the case, then this network subscriber would have had to receive a better value from some other network subscriber, and would have then dropped out of the comparison process, before receiving its own random value back again.

In accordance with an added mode of the invention, a simple number used as the random value. This means that each affected network subscriber generates a random number, which is compared with the random numbers generated by all of the other network subscribers involved. The master function can then be assigned either to the network subscriber with the highest random number, or the one with the lowest random number.

In accordance with an additional mode of the invention, the random value is a period of time that each affected subscriber needs to execute an arbitrary operation. The master function is assigned to the network subscriber that has completed this operation first. As soon as a collision situation occurs, a previously defined operation is then executed in the network subscribers involved, the performance of which operation takes a length of time that is dependent on the period of time that has been determined as the random value.

In accordance with yet another mode of the invention, as soon as a network subscriber has completed this operation, then the operation is preferably discontinued in all of the other network subscribers as well. The master function is accordingly assigned to the network subscriber having the randomly chosen shortest period of time, and this is immediately imparted to all of the other network subscribers affected. This prevents the assignment of the master function to another network subscriber as well, and the attendant occurrence of another collision.

Instead of discontinuing the operations in all of the other network subscribers, one can render the assignment function inoperative for those network subscribers. The operations can then be carried out to completion in them without a master function being assigned to these later network subscribers.

In accordance with yet a further mode of the invention, one possible such operation is counting down from one number to another, and in particular to zero. At least one of the two numbers is generated as a random number by the network subscriber involved and thus determines the period of time required for performing the operation.

In accordance with yet an added mode of the invention, the instance of a collision is ascertained from the fact that a network subscriber being used as a master outputs master-specific signals and at the same time receives master-specific signals from another network subscriber also being used as a master.

In accordance with yet an additional mode of the invention, a clock signal generated by a network subscriber is used in this case as the master-specific signal. As soon as the above-described collision situation is ascertained in this way, the comparison process according to the invention is tripped in the network subscribers involved in the collision, whereupon an unequivocal assignment of the master function can be made.

In the method of the invention, in rare cases it is possible for two or more network subscribers to generate a random value of equal quality, in which case these network subscribers are then once again assigned the master function substantially simultaneously. Therefore, in accordance with again another mode of the invention, the method described can be tripped once again in these network subscribers. This procedure is optionally repeated until such time as an unequivocal assignment of the master function has been made.

In accordance with again a further mode of the invention, either a plurality of network subscribers or all of the network subscribers are constructed in such a way that they are capable of taking on the master function.

In accordance with a concomitant mode of the invention, the method of the invention is used in a network-type stationary or mobile communications system, in particular in a communications system in the home or in a motor vehicle.

Other features which are considered as characteristic for the invention are set forth in the appended claims.

Although the invention is illustrated and described herein as embodied in a method for initializing a network having a plurality of network subscribers capable of acting as masters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a block circuit diagram of a ring-like network that can be operated by the method according to the invention.

DESCRIPTION OF THE PREFERRED EMBODIMENTS

Figure 1:
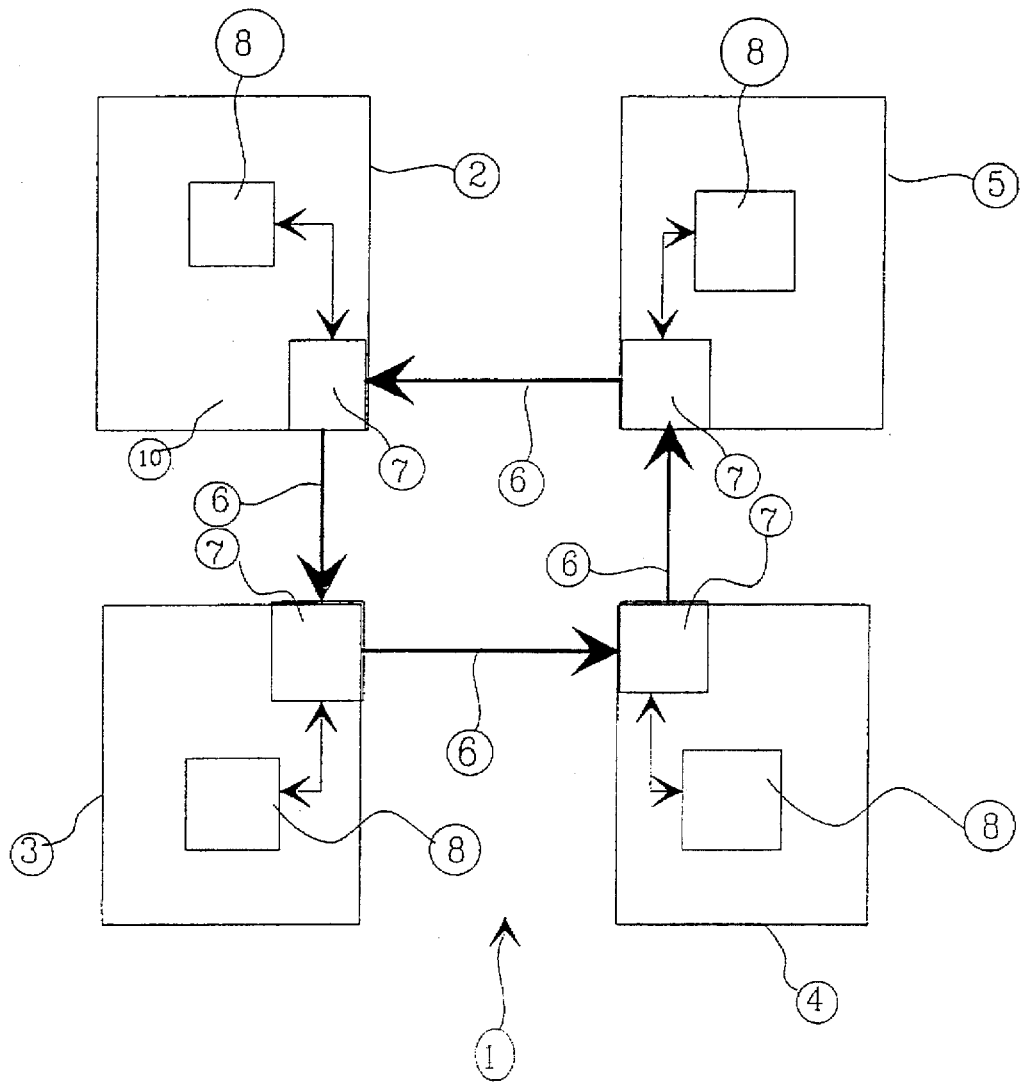

Referring now to the single FIGURE of the drawing in detail, there is seen a ring-like network that has four network subscribers 2, 3, 4, 5, which are connected to one another over data lines 6 to form a ring-like structure. All of the data between the individual network subscribers 2, 3, 4, 5 are always transmitted unidirectionally, counterclockwise, over the data lines 6 in the network 1 as shown.

Each of the network subscribers 2, 3, 4, 5 has an input/output interface 7, to which the network subscriber preceding it and the network subscriber following it in the unidirectional, ring-like network are connected. The various network subscribers 2, 3, 4, 5 communicate with one another through the interfaces 7 and the data lines 6.

Each network subscriber 2, 3, 4, 5 also has a microprocessor 8, which transmits data to the interface 7 assigned to it and receives data from that interface 7.

The network 1 described above, upon being put into operation, functions as follows:

The various network subscribers 2, 3, 4, 5 can be turned on at various times, as needed. Whichever network subscriber 2, 3, 4, 5 is turned on first is assigned the master function. All of the network subscribers 2, 3, 4, 5 are constructed in such a way as to be suitable for taking on the master function.

In the event that a plurality of network subscribers, for example the network subscribers 2 and 4, are turned on simultaneously, the master function is assigned to these network subscribers 2, 4. Both network subscribers 2, 4 thereupon output a master-specific signal, such as a clock signal, which is received by the other respective network subscriber 2, 4 through the data lines 6 and the interfaces 7. In that case, it is ascertained in both network subscribers 2, 4 that a collision situation has occurred, in which two network subscribers have simultaneously been assigned the master function.

According to the invention, the microprocessors 8 of the two network subscribers 2, 4 thereupon each generate a random number, which on one hand is stored in memory in the applicable network subscriber 2, 4 and on the other hand is fed into the network through the applicable interface 7. The random number generated by the network subscriber 2 is thus passed on to the next network subscriber 3. This network subscriber is not involved in the comparison process and therefor merely passes the random number onward, to the next network subscriber 4 in succession.

This network subscriber is involved in the comparison process, and it therefore compares the random number it has received with the random number it generated and stored in memory. If it finds that the received random number is higher than the memorized random number, then it drops out of the comparison process, and passes the random number it has received on to the next network subscriber 5. This network subscriber, in turn, is not involved in the comparison process, but instead merely forward the random number it has received on to the next network subscriber 2, which had output this random number originally.

The master function is then assigned to the network subscriber 2, which is the one that in this case finds that the random number it has received matches the random number it has stored in memory. In other words, this network subscriber then begins to output the clock signals.

The procedure is the same for the random value output by the network subscriber 4. In other words, the network subscriber 5 merely forwards this random number onward, since it is not a participant in the comparison process. The network subscriber 2 ascertains that its memorized random number is higher than the random number received. It therefore continues participating in the comparison process and passes the random number it has received onward. However, passing on of the smaller random number it received could be omitted, since all of the network subscribers that follow the network subscriber 2 will have first received the higher random number of the network subscriber 2, and will have dropped out of the comparison process already as appropriate. In this way it is assured that whichever one of the two colliding network subscribers 2 and 4 that has generated the higher random number will be assigned the master function. An unequivocal assignment of the master function to one of the colliding network subscribers is thus possible without requiring that these network subscribers be turned on all over again.

We claim:

1. In a method for initializing a network having a plurality of network subscribers being capable of acting as masters, which includes assigning a function of acting as a master to the network subscriber being capable of acting as a master that is turned on first, the improvement which comprises:

in the event of a collision when the master function is assigned substantially simultaneously to a plurality of substantially simultaneously turned-on network subscribers, generating a random value differing in magnitude in the plurality of network subscribers;

comparing magnitudes of the generated random values in the affected network subscribers;

finally assigning the master function to the network subscriber having generated the best value, in the sense of being the highest or the lowest value; and causing the affected network subscribers to exchange the random values they have generated with one another, and causing each network subscriber to drop out of the comparison process when it receives a better value than the random value it generated itself.

2. The method according to claim 1, which comprises configuring the network in a unidirectional ring structure; passing the random values from the affected network subscribers to the next network subscriber in succession through the network; and assigning the master function to the network subscriber participating in the comparison process which receives the random value back again that it had generated itself.

3. In a method for initializing a network having a plurality of network subscribers being capable of acting as masters, which includes assigning a function of acting as a master to the network subscriber being capable of acting as a master that is turned on first, the improvement which comprises:

in the event of a collision when the master function is assigned substantially simultaneously to a plurality of substantially simultaneously turned-on network subscribers, generating a random number differing in magnitude in the plurality of network subscribers;

comparing magnitudes of the generated random numbers in the affected network subscribers; and finally assigning the master function to the network subscriber having generated the best number, in the sense of being the highest or the lowest number.

4. In a method for initializing a network having a plurality of network subscribers being capable of acting as masters, which includes assigning a function of acting as a master to the network subscriber being capable of acting as a master that is turned on first, the improvement which comprises:

in the event of a collision when the master function is assigned substantially simultaneously to a plurality of substantially simultaneously turned-on network subscribers, generating a random value differing in magnitude in the plurality of network subscribers;

comparing magnitudes of the generated random values in the affected network subscribers;

selecting a period of time that each affected subscriber needs to execute an arbitrary operation, as the random value;

and assigning the master function to the network subscriber that has completed the arbitrary operation first.

5. The method according to claim 4, which comprises terminating the operation in all of the network subscribers, as soon as the operation is concluded in one of the network subscribers.

6. The method according to claim 4, which comprises carrying out the operation occupying the random period of time by generating a random number and subsequently counting it downward.

7. The method according to claim 6, which comprises counting the random number down to zero.

8. In a method for initializing a network having a plurality of network subscribers being capable of acting as masters, which includes assigning a function of acting as a master to the network subscriber being capable of acting as a master that is turned on first, the improvement which comprises: in the event of a collision when the master function is assigned substantially simultaneously to a plurality of substantially simultaneously turned-on network subscribers, generating a random value differing in magnitude in the plurality of network subscribers;

comparing magnitudes of the generated random values in the affected network subscribers;

finally assigning the master function to the network subscriber having generated the best value, in the sense of being the highest or the lowest value; and ascertaining the instance of a collision from the fact that a network subscriber being used as a master outputs master-specific signals and at the same time receives master-specific signals from another network subscriber also being used as a master.

9. The method according to claim 8, which comprises outputting a clock signal as the master-specific signal.

10. In a method for initializing a network having a plurality of network subscribers being capable of acting as masters, which includes assigning a function of acting as a master to the network subscriber being capable of acting as a master that is turned on first, the improvement which comprises: in the event of a collision when the master function is assigned substantially simultaneously to a plurality of substantially simultaneously turned-on network subscribers, generating a random value differing in magnitude in the plurality of network subscribers;

comparing magnitudes of the generated random values in the affected network subscribers;

finally assigning the master function to the network subscriber having generated the best value, in the sense of being the highest or the lowest value;

and, in the event that a plurality of network subscribers generate a random value of equal quality, and the plurality of network subscribers are then once again assigned the master function substantially simultaneously, repeating the method in the plurality of network subscribers.

11. In a method for initializing a network having a plurality of network subscribers being capable of acting as masters, which includes assigning a function of acting as a master to the network subscriber being capable of acting as a master that is turned on first, the improvement which comprises:

in the event of a collision when the master function is assigned substantially simultaneously to a plurality of substantially simultaneously turned-on network subscribers, generating a random value differing in magnitude in the plurality of network subscribers;

comparing magnitudes of the generated random values in the affected network subscribers;

finally assigning the master function to the network subscriber having generated the best value, in the sense of being the highest or the lowest value; and using only network subscribers being capable of acting as masters in the network.

* * * * *